(12) United States Patent
Zongker

(10) Patent No.: US 9,032,281 B2
(45) Date of Patent: May 12, 2015

(54) SYSTEM AND METHOD FOR COLLECTING FINANCIAL INFORMATION OVER A GLOBAL COMMUNICATIONS NETWORK

(75) Inventor: Jeremy Carroll Zongker, Broken Arrow, OK (US)

(73) Assignee: Deposits Online, LLC, Birmingham, AL (US)

( * ) Notice: Subject to any disclaimer, the term of this patent is extended or adjusted under 35 U.S.C. 154(b) by 187 days.

(21) Appl. No.: 13/448,170

(22) Filed: Apr. 16, 2012

(65) Prior Publication Data

US 2014/0013194 A1  Jan. 9, 2014

Related U.S. Application Data

(60) Provisional application No. 61/586,806, filed on Jan. 15, 2012.

(51) Int. Cl.
  *G06F 17/00* (2006.01)
  *G06F 17/30* (2006.01)
  *G06F 17/40* (2006.01)

(52) U.S. Cl.
  CPC ............ *G06F 17/30* (2013.01); *G06F 17/40* (2013.01)

(58) Field of Classification Search
  CPC .......... G06F 17/30; G06F 17/40; G06F 17/21
  USPC ......................................... 715/205, 234, 240
  See application file for complete search history.

(56) References Cited

U.S. PATENT DOCUMENTS

| | | | |
|---|---|---|---|
| 7,523,401 B1 | 4/2009 | Aldridge | |
| 7,734,526 B2 * | 6/2010 | Howard et al. | 705/36 R |
| 7,958,053 B2 | 6/2011 | Stone | |
| 2002/0087624 A1 * | 7/2002 | Liebenow | 709/203 |
| 2002/0143680 A1 * | 10/2002 | Walters et al. | 705/36 |
| 2002/0156890 A1 | 10/2002 | Carlyle et al. | |
| 2003/0172014 A1 | 9/2003 | Quackenbush et al. | |
| 2004/0189718 A1 | 9/2004 | Stein et al. | |
| 2004/0260602 A1 * | 12/2004 | Nakaminami et al. | 705/11 |
| 2005/0080694 A1 * | 4/2005 | Schmidt | 705/35 |
| 2006/0047724 A1 | 3/2006 | Messing et al. | |
| 2006/0241989 A1 * | 10/2006 | Walters et al. | 705/7 |

(Continued)

FOREIGN PATENT DOCUMENTS

| | | |
|---|---|---|
| KR | 10-2009-0095528 A | 9/2009 |
| WO | 02/19218 A2 | 3/2002 |

(Continued)

*Primary Examiner* — Stephen Hong
*Assistant Examiner* — Marshon Robinson
(74) *Attorney, Agent, or Firm* — The Gache Law Firm, P.C.; Rusell C. Gache

(57) ABSTRACT

A system comprises a combination of user examination decisions and semi-automated extraction tools, integrated into a web-based administration interface, to permit a user to quickly catalog a publically available financial website and extract financial rate data in a reproducible manner. The reproducibility of the extraction process allows for automated processes to re-extract the rate data as often as necessary to attain at least daily accuracy of recorded financial rates for a financial institution. The system allows for the tracking of over a quarter of a million financial rates, across varying website technologies and display formats, and the daily tracking of financial institution product data and especially financial products with frequently changing rates. A stable repository of rate data is also created to allow for data mining of financial trends to syndicated parties.

21 Claims, 11 Drawing Sheets

(56) References Cited

U.S. PATENT DOCUMENTS

| | | | |
|---|---|---|---|
| 2007/0162369 A1* | 7/2007 | Hardison, III | 705/35 |
| 2007/0174440 A1 | 7/2007 | Brier et al. | |
| 2007/0260536 A1 | 11/2007 | Stone | |
| 2007/0260537 A1* | 11/2007 | Stone | 705/39 |
| 2008/0071702 A1* | 3/2008 | Howard et al. | 705/36 R |
| 2008/0301060 A1* | 12/2008 | Ayers | 705/36 R |
| 2010/0063938 A1 | 3/2010 | Kantor et al. | |
| 2010/0145826 A1* | 6/2010 | Callow et al. | 705/27 |
| 2012/0054598 A1* | 3/2012 | Lin et al. | 715/235 |

FOREIGN PATENT DOCUMENTS

| | | |
|---|---|---|
| WO | 2006/135577 A3 | 12/2007 |
| WO | 2011/043752 A1 | 4/2011 |

* cited by examiner

SYSTEM AND METHOD FOR COLLECTING FINANCIAL INFORMATION OVER A GLOBAL COMMUNICATIONS NETWORK

This application claims the benefit of filing priority under 35 U.S.C. §119 and 37 C.F.R. §1.78 of the U.S. Provisional Application Ser. No. 61/586,806 filed Jan. 15, 2012, for a System and Method for Collecting Financial Information Over a Global Communications Network. All information disclosed in that prior pending provisional application is incorporated herein by reference

FIELD OF THE INVENTION

The present invention relates generally to data gathering and mining. In particular, the present invention relates to financial monitoring services. In greater particularity, the present invention relates to financial data scraping and cataloging from Internet data sources.

BACKGROUND OF THE INVENTION

The consumer financial products industry consists of tens of thousands of financial institutions offering a wide variety of individual financial products to consumers, almost all of which advertise and offer their services over the world wide web (hereinafter the "Web"). For example, currently, there can be found over 15,000 FDIC and NCUA-insured banks and credit unions offering financial services in the US, almost all of which offer deposit products to consumers and businesses. These institutions offer on average over a dozen financial products, each having varying tiers with separate interest rates. The result is well over a quarter million different interest bearing products in the US alone. However, tracking the interest rates offered by these institutions for each of their products and trying to get a sense of what is a reasonable or competitive rate among these institutions is a challenge. Further, compiling trend data for these interest rates is even more challenging, requiring hundreds of man hours to input and correlate such rate data. This causes delays in compiling trend data and seriously diminishes the usefulness of any such trend analysis.

There are some services on the Internet that track interest data and publish averages and trends on their websites. These "rate data aggregators" as they are known acquire their rate data primarily through direct interactions with financial institutions, and often are the result of long-standing relationships with the financial institutions offering the products that are tracked. However, inefficiencies and challenges with current rate product data acquisition methods lead to costly, incomplete, and out-of-date rate data. The rate data is typically gathered via a combination of scattered, and mostly manual processes, such as for example: call centers staffed by teams of callers to contact and record rates offered by selected institutions; email requests that are transmitted with a cataloging of replies; collection of rate data using voluntary FTP connections; accessing secure databases; and the recordation of data received in broadcast faxes from institutions. These manual collection strategies result in numerous human born errors, and are typically not relevant to current rates because of the delay between the collection of the data and the inputting and correlation of that rate data. Also, these collection strategies are relegated to a sample size attainable by human collection efforts, and do not allow the assimilation of a high percentage of available rates. Finally, much of the data is dependent upon an interactive and cooperative relationship between the financial institution offering a product and the collection service wishing to obtain the rate data. Such relationships can deteriorate rapidly, and require resources to maintain. Moreover, human collection efforts are relatively expensive, thereby requiring a higher return on a data collection investment which can jeopardizing business continuity.

Therefore, what is needed is a system that monitors and parses financial institution websites for financial product rate data, especially focusing on products with frequently changing rate data, across a plurality of website technologies and display formats, and then publishes that data on the Web for easy consumer access. The system would also create a very large repository of structured rate data from which current rate data trends may be ascertained in real-time to licensed subscribers.

SUMMARY OF THE INVENTION

It is the object of the present invention to access a financial website site disclosing rate data; evaluate how such rate data is displayed on the website; record the position and method of such data display, along with the rate data itself; and import that data daily and make it available via a publically available website. A combination of user examination decisions and semi-automated extraction tools, integrated into a web-based administration interface, permit a user to quickly catalog a financial website and extract financial rate data in a reproducible manner. The reproducibility of the extraction process allows for automated processes to re-extract the rate data as often as necessary to attain at least daily accuracy of recorded financial rates for an institution. Other features and objects and advantages of the present invention will become apparent from a reading of the following description as well as a study of the appended drawings.

BRIEF DESCRIPTION OF THE DRAWINGS

A financial rate data collection system incorporating the features of the invention is depicted in the attached drawings which form a portion of the disclosure and wherein:

FIG. 4B is another screen capture of an administrative interface used by a user of the invention;

FIG. 4C is another screen capture of an administrative interface used by a user of the invention;

FIG. 4D is another screen capture of an administrative interface used by a user of the invention;

DESCRIPTION OF THE PREFERRED EMBODIMENTS

Figure 1:
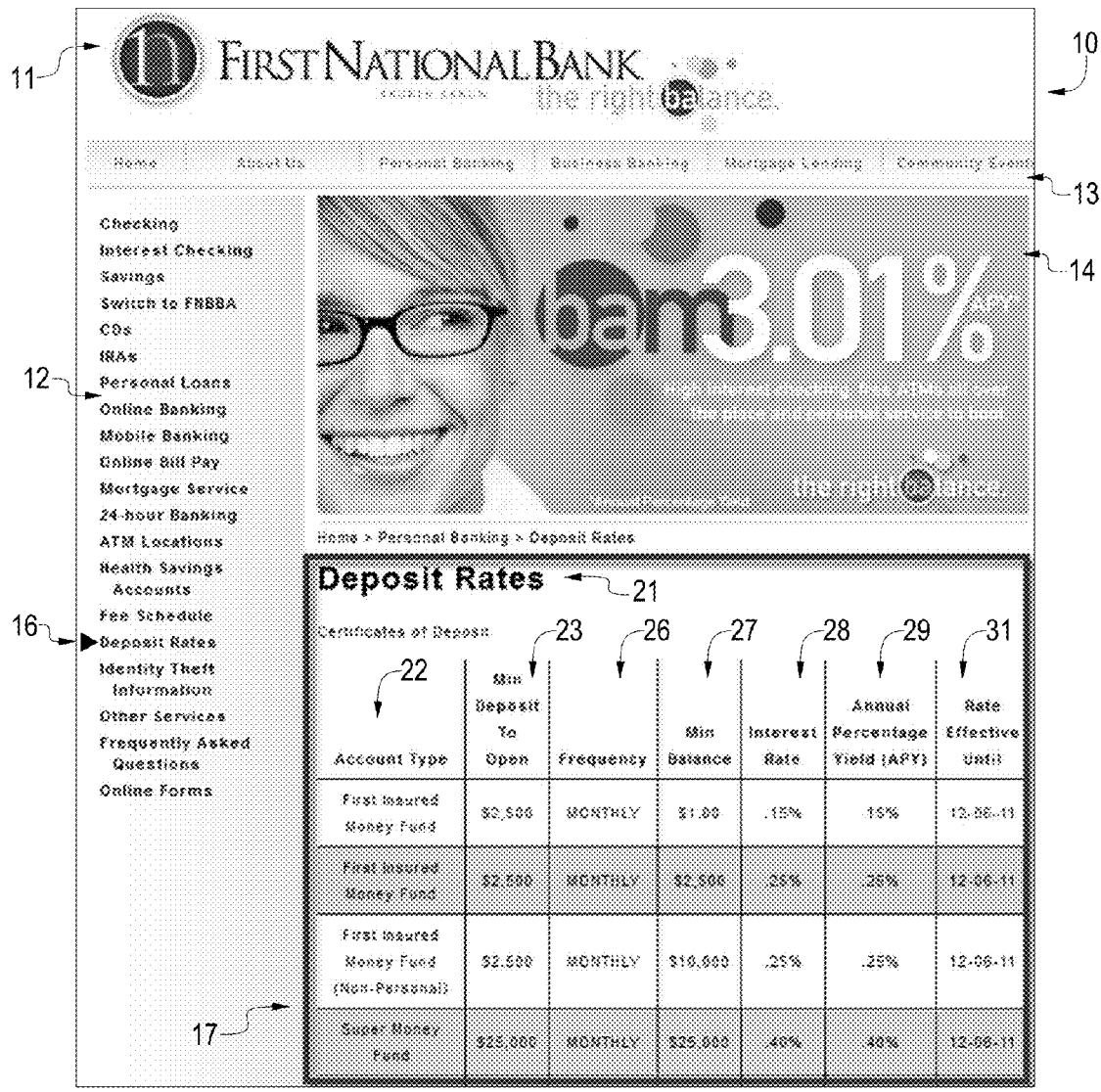
FIG. 1 is an example of a website site of typical financial institution on which rate information is published and updated frequently.

Referring to the drawings for a better understanding of the function and structure of the invention, a typical financial website is shown in FIG. 1. The financial website 10, includes typical elements found in most financial web sites. A mastiff 11 or header appears at the top of the web page and, typically, denotes the name of the financial institutions providing services and includes a brand logo. At the left side of the web page, a navigation menu 12 provides a list of navigation destinations disclosing various services and information provided by the website 10. A series of a menu tabs 13 provide some additional navigation conduits denoting generalized collections of information provided by the website 10. Banner advertisements 14 are also placed at advantageous locations on the website 10 in order to further advertise services offered by the institution 11 that owns the website, or for third parties to provide a secondary source of revenue for the entity 11.

Typically, a financial website will group rate information 16 on a page dedicated to the display of financial rates, as may be seen in window frame 17. As may be seen in frame 17, the institutions typically display their rate information associated with various products that they offer in a table or matrix configuration. Any type of financial account type 22 may be shown at the left side of the frame, such as for example a certificate of deposit or money market account, with various feature headings spread along the top of the table 23-31. The various feature headings of each account are shown, such as, a minimum deposit to open the account 23, and a duration or frequency of interest application 26, a minimum balance 27, an interest rate 28, an annual percentage yield 29, and a rate expiration 31 date. Nomenclature associated with the values shown in rate frame 17 are typical, and generally standardized in the financial industry such that standard labels associated with financial products may be easily recorded in a database utilizing label templates.

As noted previously, the rate information 28 is generally in constant flux and is the most difficult to keep up with via a search extraction or search spider, mainly because these searching processes are not intelligent enough to tie numerical values to a correct financial product attribute. For example, frame 17 may be displayed to a visitor as a graphical image, as a portable document file ("PDF"), HTML, XML, simple text, an Adobe flash based image, or a simple graphical image, any of which will have a plurality of numerical values scattered throughout the data held in these varying formats. The herein described system intelligently identifies such display methods through a combination of human and software based processes so that numerical rate information may be accessed and correctly mapped to a financial product's associated attribute.

Figure 2:
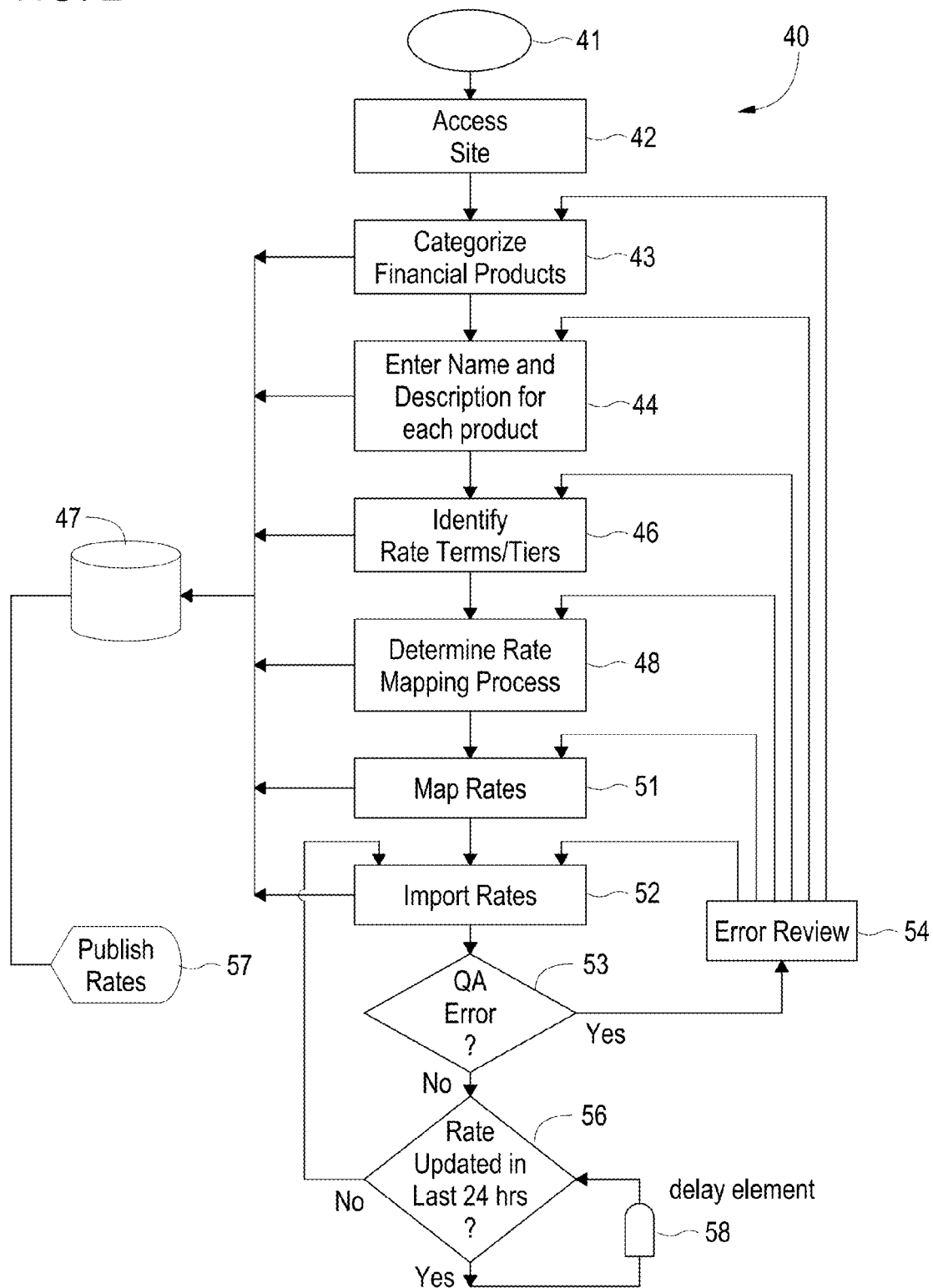
FIG. 2 is a block diagram showing the general process to obtain and publish financial data using the invention.

Referring now to FIG. 2, system 40 initiates 41 by a user reviewing bank listings released by the FDIC and credit union listings released by the NCUA, typically in stub records form, which may be access over the internet with a conventional browser or after obtaining a copy of the stub file and accessing it with a suitable word processor or file viewer on a local workstation. A stub record includes, typically, a bank's name, address, website URL, and its assigned FDIC or NCUA number. Any banks or credit unions appearing on the bank listings that have not been incorporated into the system 40 are added to a bank add process queue for a user to establish a system record for the institution. For the purposes of the herein disclosed system, the word "bank" shall be used in a generic sense to denote any type of financial institution, such as banks or credit unions.

The herein described system 40 utilizes standard database technologies and web-based scalable server systems. The system 40 is written in ASP.NET 3.5 and C#, with the database structure held by a Microsoft SQL server 2005. The web server platform is IIS 7 running on Microsoft Windows 2008 servers. Libraries containing data access code and business logic reside on the webserver and are structured to access the SQL server database. An administration interface, an importation service, and an API interface are connected to the database through the libraries residing on the webserver. However, any modern library and the admin interface may be utilized for accessing a database, as it is known in the art. The inventor notes that such technologies are readily available for lease from vendors such as Amazon, that allow for automatic scaling of SQL server database size as data accumulates, and user interfaces for such SQL servers are available using a standard internet browser front end. Hence, data input for a new financial institution is expedited and economical using an online internet based browser interface from which a user may input data associated with a selected financial institution into a remote SQL database. Further information regarding the vehicle through which data entry may be stored shall be omitted as such technology is well understood and unnecessary for a complete understanding of the invention.

A user accesses the site 42 of the institution and determines whether or not interest rates for their financial products are published online. If their rates are available online, the user indicates the exact url(s) where the rates are located, or alternatively indicates that rates are unavailable which removes the bank's record from the process queue.

Process 40 results in the "indexing" of a bank's financial product data in a "rate sheet," which results in the ability to import and revise financial rate data in near real-time. Process 40 may be delineated into three primary sub processes: (1) establishing of a new bank into the database; (2) mapping the published rate data into the database; and (3) importing and monitoring the integrity of the rate data presented on the bank's website. These sub processes are shown in FIG. 2, for once a bank has been added to the queue each of the financial products publicly offered by the bank are categorized into standard types of financial products 43 and entered into database 47. A standardized or generic name for each product is then entered 44 into the database 47 along with a short description for each product 44. Rate terms and tiers are then identified 46 and entered into the database 47.

For example, referring again to FIG. 1, various terms 26 or tiers 27 are identified and associated in the database 47 for each financial product for each financial institution entered into the system. By accessing the financial institution's website, web pages holding rate information, referred to herein as "Rate Pages", are identified and the associated url recorded in the database 47. A rate mapping process 48 is then initiated so that rates for each of the financial products offered by the financial institution may be mapped 51. The rates can then be imported 52 and stored in database 47, and through an automated process, as will be described, updated as often as necessary to maintain accurate rate data. The mapping process of steps 48 and 51 are hereby defined as a method by which the location of rate information on a Rate Page is recorded and an appropriate importation process identified so that the rate information may be imported via step 52 and recorded in database 47. Quality assurance rules 53 are applied to the importation process 52 to ensure the rates do not include errors, and in if errors are discovered the record is flagged for manual review 54. Manual review 54 may include manual intervention in any of the steps 48, 51, or 52 to rectify an error, or prior steps 43, 44, or 46 to accommodate bank changes to the site. A timing update sub-process 56 controls when and how often a rate is imported via step 52. Element 58 integrates a timing delay function programmable to control the frequency of the rate importation. Database 47 holds all rate information which may be published to a user, such as through a public web site, upon demand 57.

It should be noted that many of the steps of FIG. 2 that include a human activity may be completed independently by various workers such that collective assembly line efficiency may be achieved for process 40. So, while the name "user" appears throughout this description the invention is not so limited to a single user, and the system is designed to allow for a relatively small group of trained workers to track a great number of financial institutions.

Figure 3:
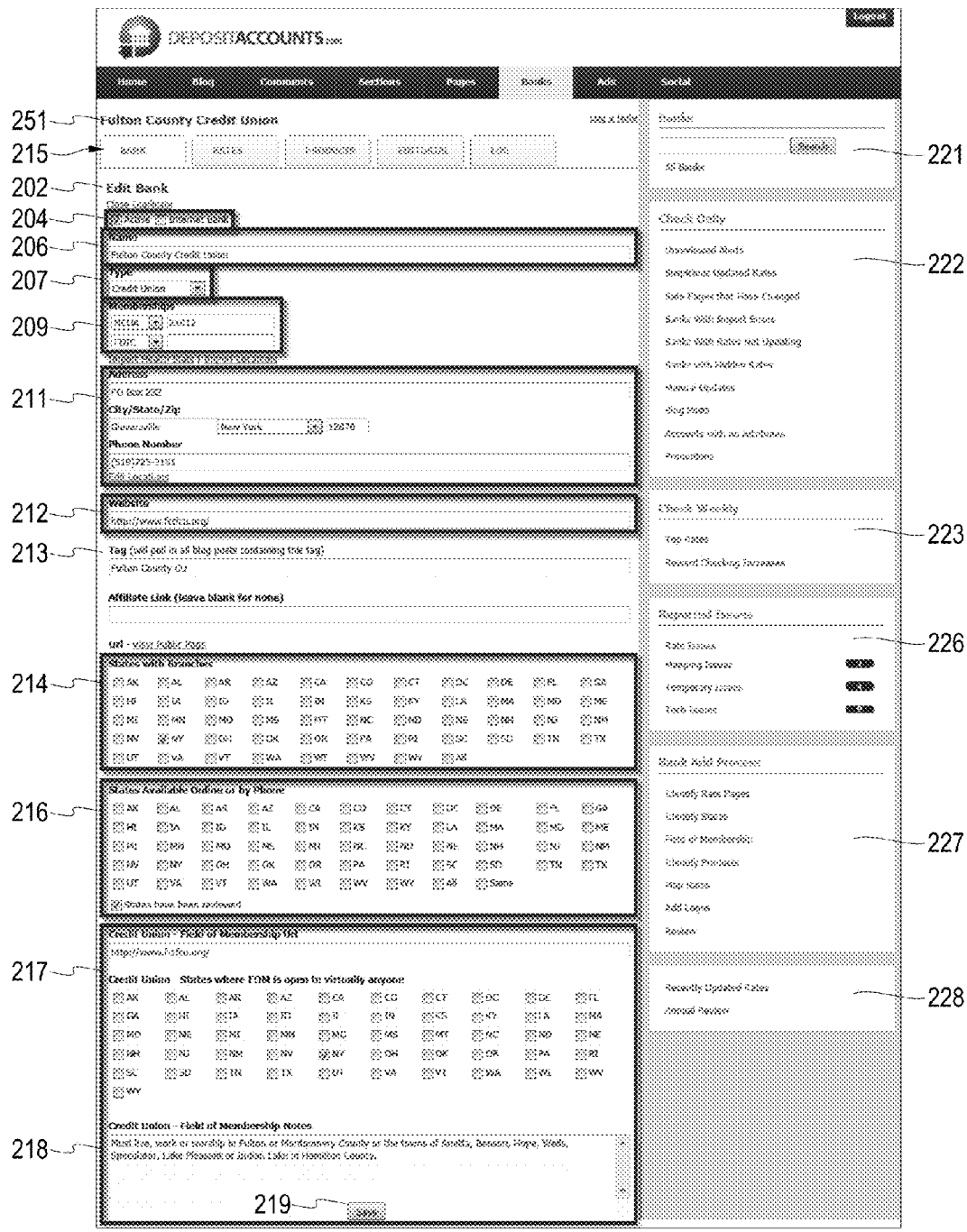
FIG. 3 is a screen capture of an administrative interface used by a user of the invention.
Figure 4A:
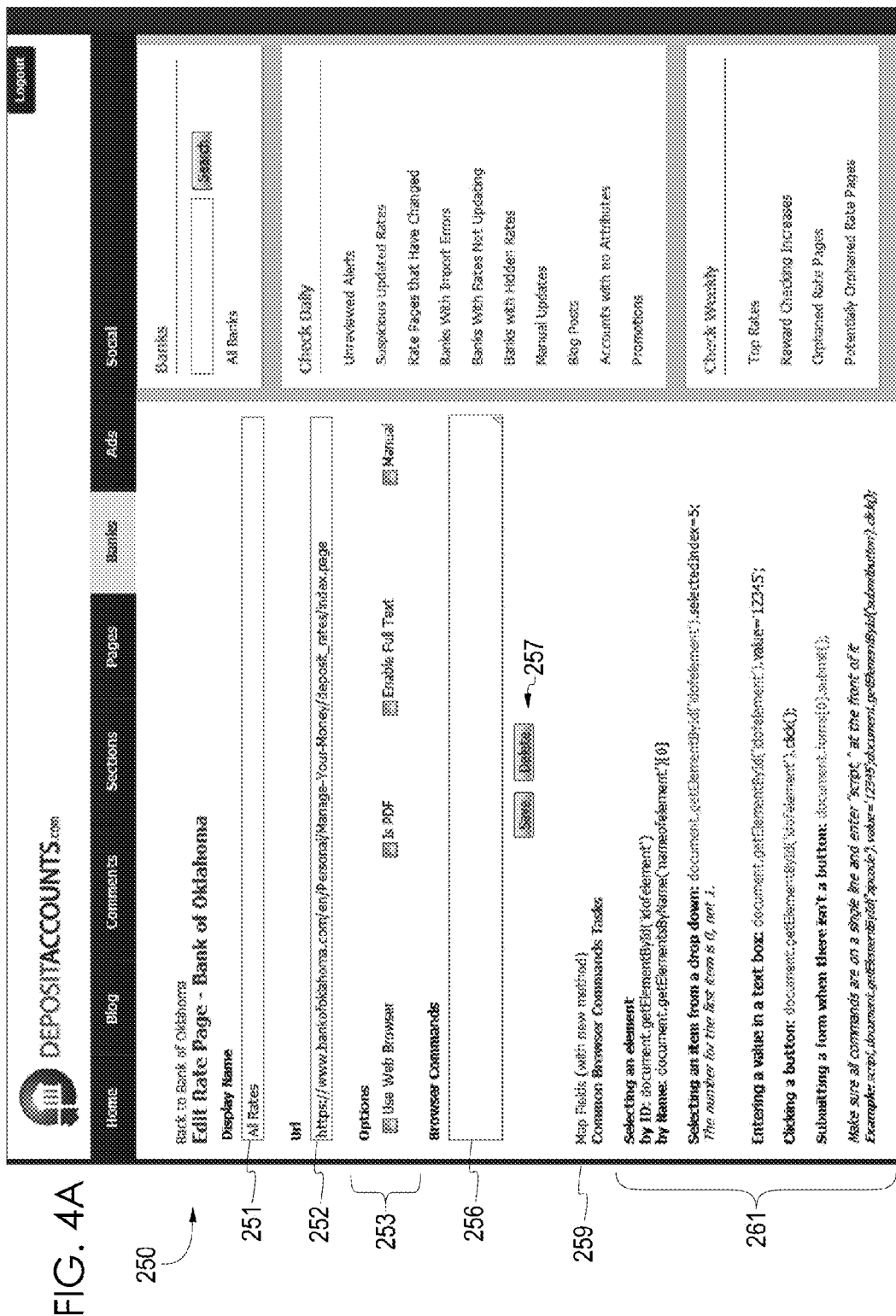
FIG. 4A is another screen capture of an administrative interface used by a user of the invention.
Figure 4B:
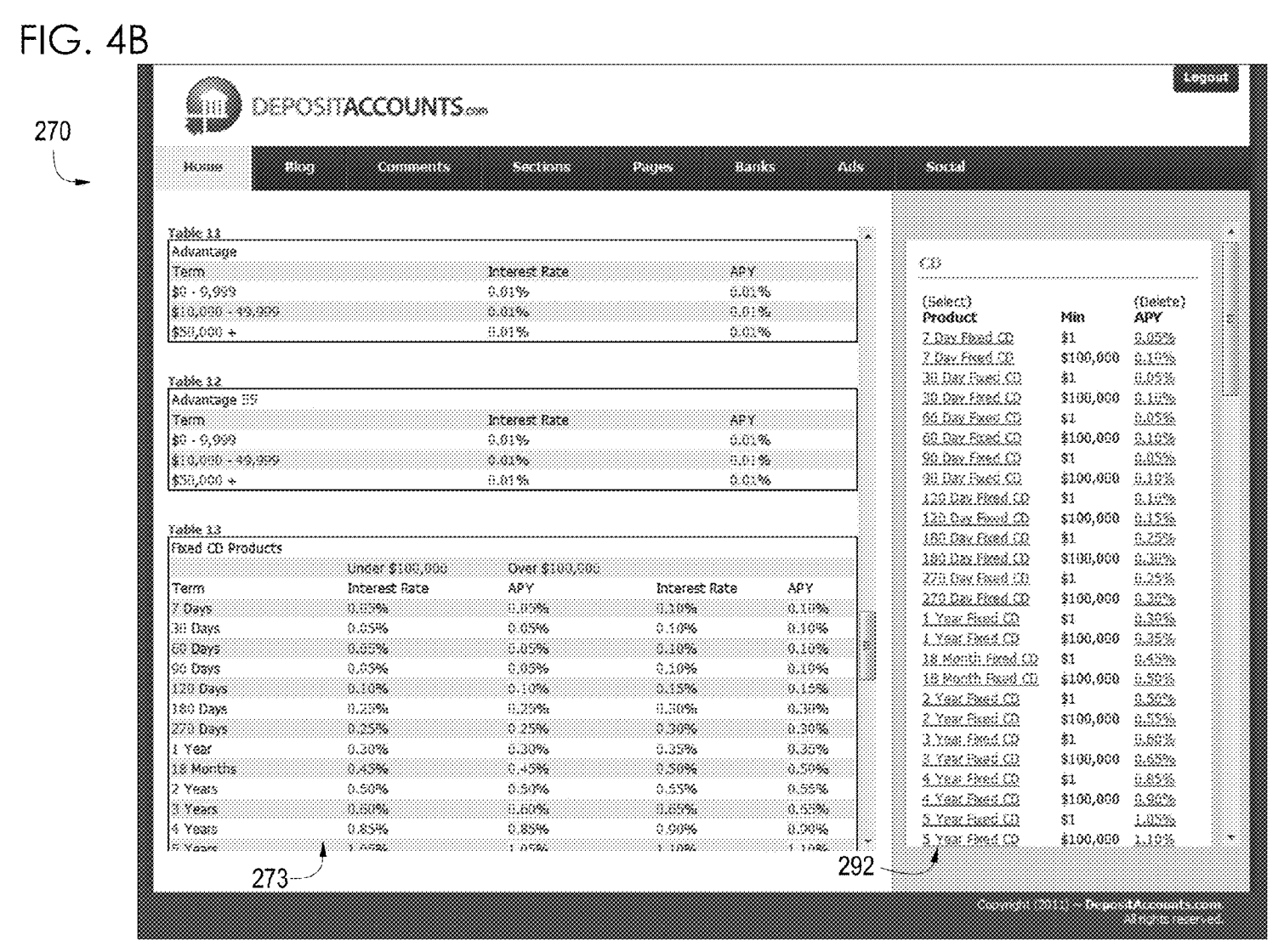
Figure 4C:
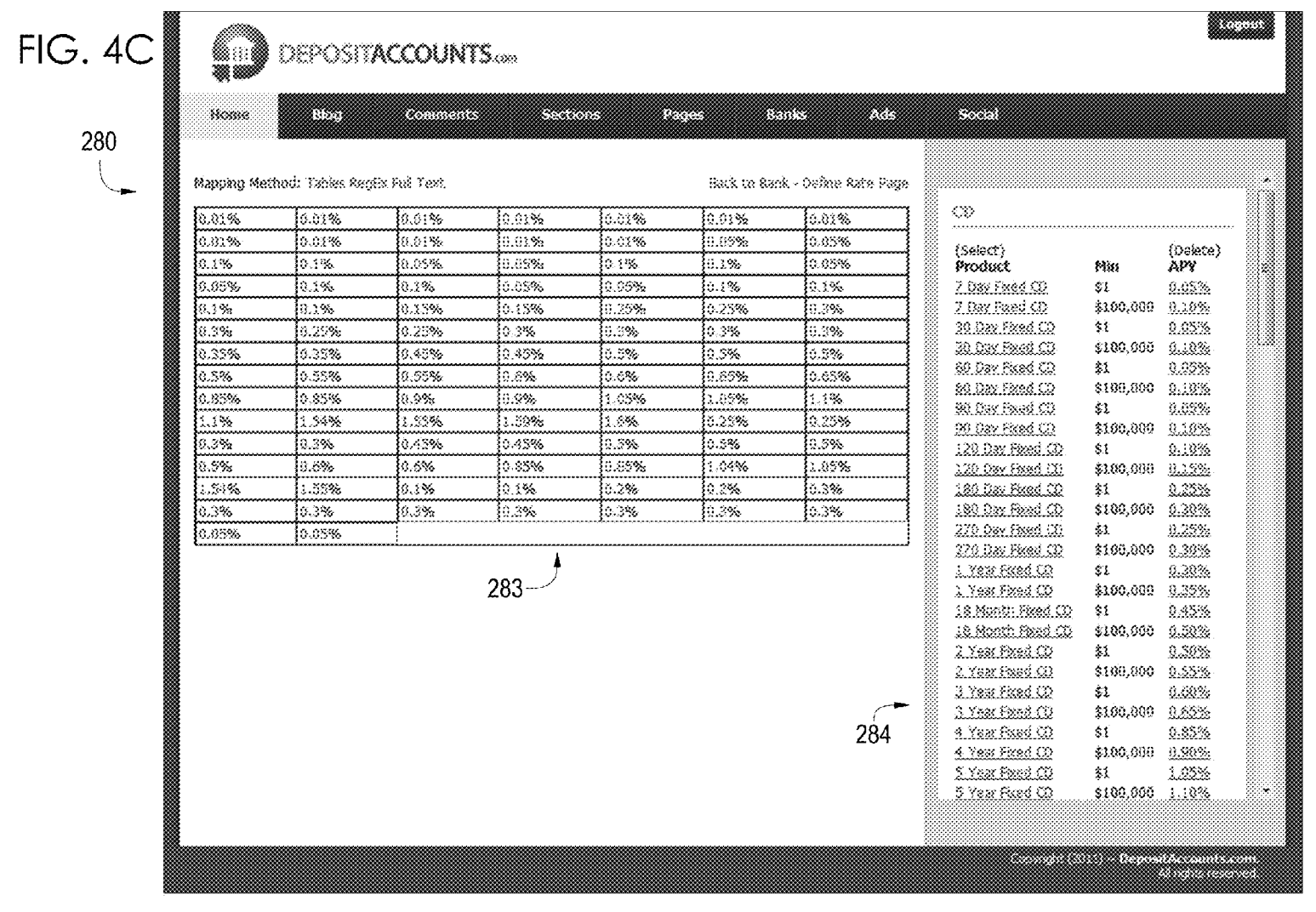
Figure 4D:
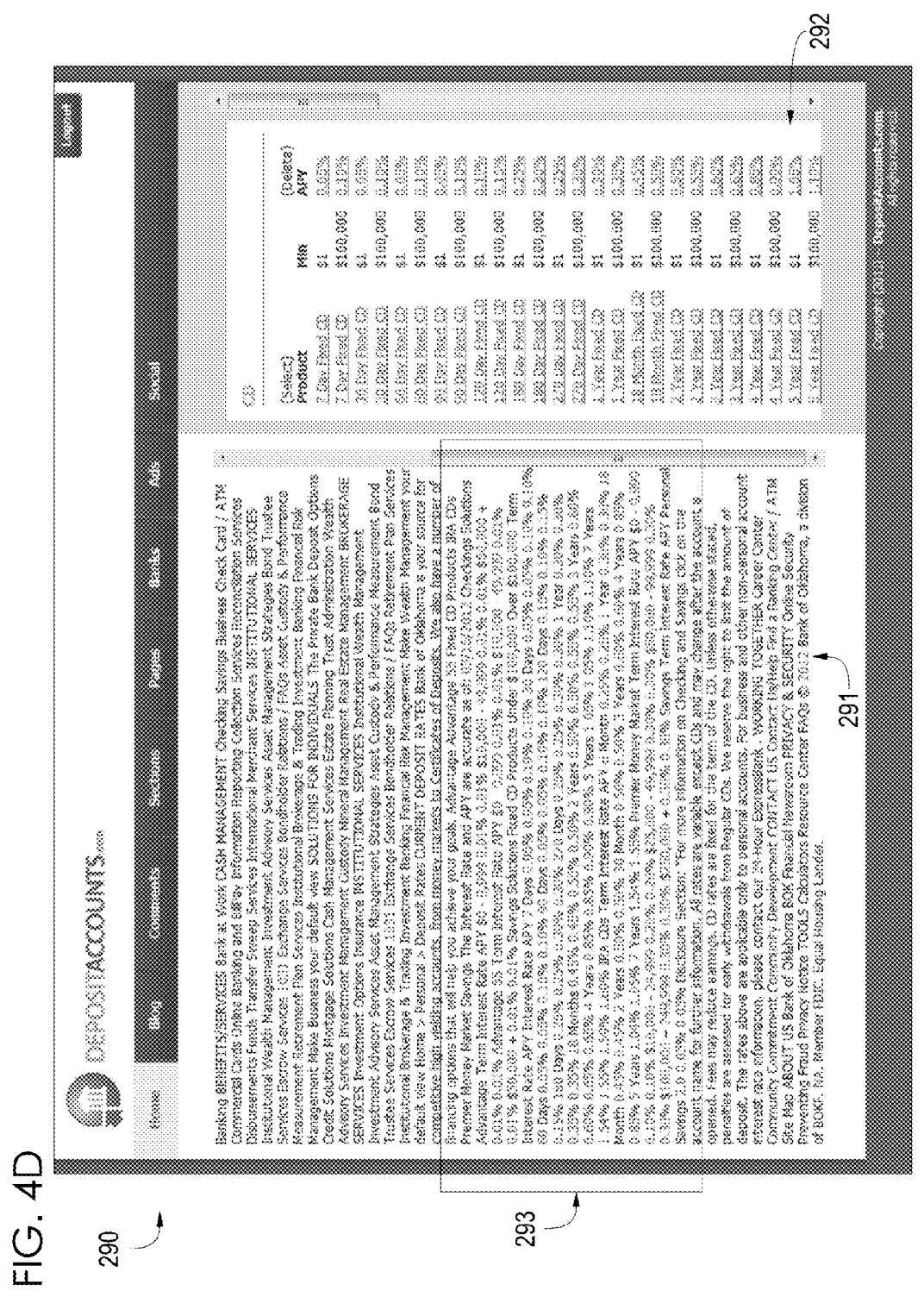
Figure 5:
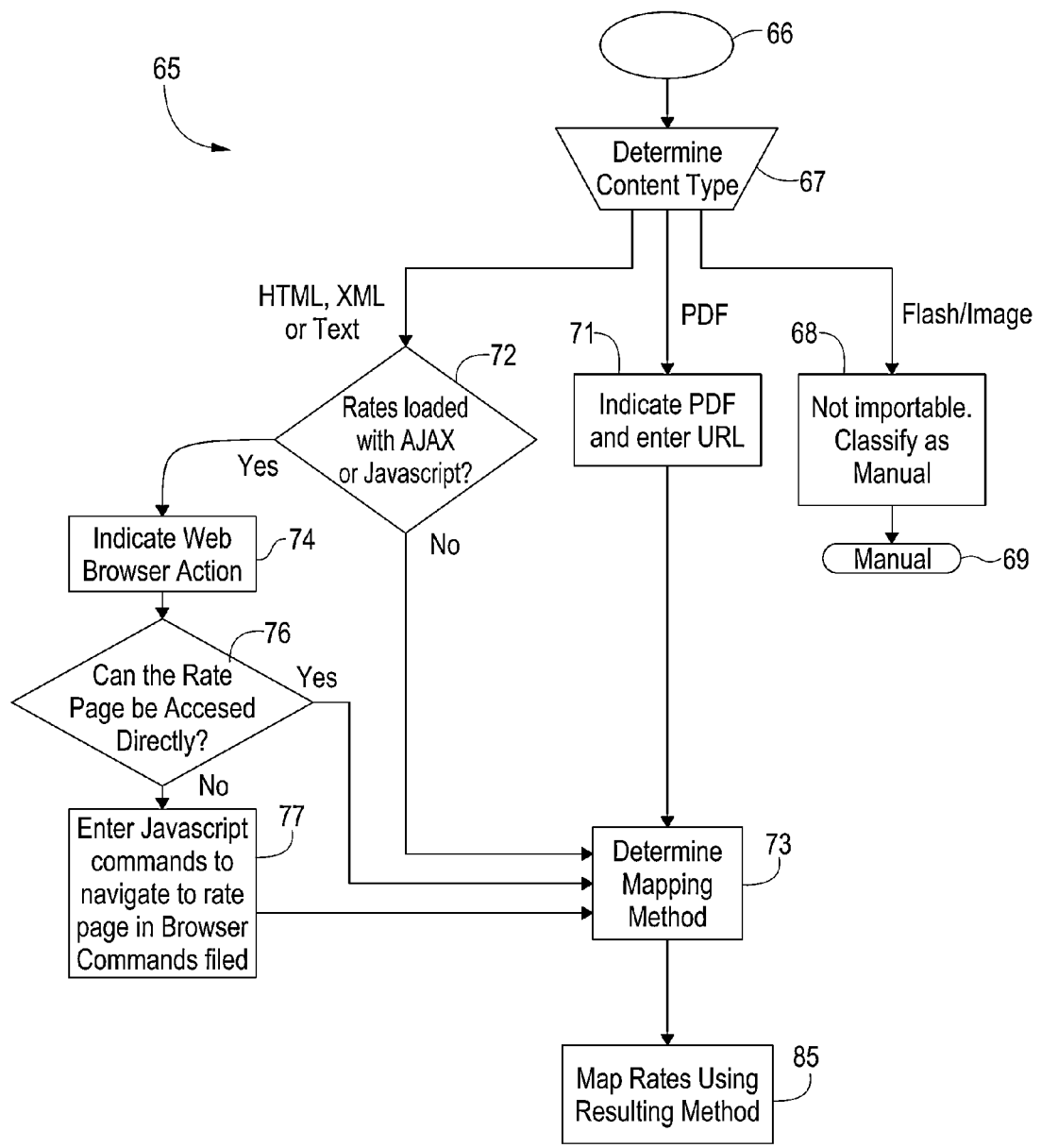
FIG. 5 is a process flow diagram of a portion of the rate mapping process.

Referring now to FIG. 5, it may be seen that mapping process 65 uses a combination of human examination steps and automated or semi-automated machine processes to understand and categorize how rates are displayed in response to the fetching of the Rate Page by a user of the system. Further, a series of user admin screen interfaces are provided to the user as shown in FIGS. 3-4(A-D) to facilitate the process described in FIG. 5, as will be further discussed. The user first determines 67 what method is used to transfer the Rate Page to a web browser. The user accesses an administrative tool (herein referred to as an "Admin Tool" or "Admin Interface") to display through an HTML browser window 250 information held in the database 47 pertaining to the financial institution. The screen an example of which is shown in FIG. 3 simply provides access to database 47 from any remote terminal allowing a user to enter and modify information pertaining to an entered financial institution at will. For example, the name of the financial institution is displayed 251, just above an Edit Bank window block 202 where a number of financial institution parameters are accessed from database 47 and may be recorded or updated as needed. For example, the following information pertaining to the financial institution may be accessed and edited: bank status 204, a name field 206, the type of financial institution and its associated institution number 209, address and phone number 211, website url 212, blog post tag 213, state branch locations 214, phone access by state 216, field of membership access by state 217, and membership notes 218. A save button 219 is also provided to allow a user to save the inputted or edited information into database 47. A series of menu tabs 215 are utilized to access other screens containing information pertaining to the bank such as rate information, products, editorial information such as blog entries, and log events for the financial institution. A second column frame or block 221-228 provides a top level admin navigation providing access to various types of system information held in the database 47.

Referring again to FIG. 5, three states of a financial institution's Rate Page are possible in which to display rate information. As shown, the Rate Page may be an HTML, XML, or text based web page; it may be a PDF; or it may be a flash or image based web page that displays the information. A user of the system accesses the rate page url saved in the database 47 through the admin interface. Through initial inspection of the Rate Page a user can quickly discern what method is used to display the information. If the Rate Page is flash based or if the rate information is rendered as an image 68, a manual process of extracting rate information must be used 69. The user logs this manual classification of the Rate Page rate information in an admin page selection box 253 (see FIG. 4A) and moves on to another bank waiting in the queue, thereby repeating process 40 for another institution.

On the other hand, if the Rate Page is generated in HTML, XML, or text, the user determines whether the rates are loaded through an AJAX (asynchronous) or Javascript routine 72. For example, a user of the system may make a visual inspection of the Rate Page after being loaded, its HTML code, or notice a delay in the time it takes for a page to load in order to confirm which is used. If AJAX or Java are not utilized, the Rate Page is evaluated the best extraction options 73. If AJAX or Java are utilized, the user indicates such 74 in the system by marking field 253 that a web browser process is necessary to retrieve the displayed rate data. The user then determines whether the Rate Page can be accessed directly 76 with the browser, or if not what Java script command must be used to access the information 77. Those browser commands necessary for viewing the rate data are entered into field 256 (see FIG. 4A) and saved 257.

In some cases, there is not a direct url available to access the rates on a bank's website. Visitors to the site may need to view a splash page first, select a state or an investment amount before the rates are shown. The browser commands section 256 allows admin users to enter instructions to navigate between multiple Rate Pages. For example, the instructions may be entered in the form of Javascript commands that are sent to the .NET WebBrowser control, one line at a time with a five second delay between lines to allow the next page to load. A handful of commands, such as, getElementByName ( ), getElementById( ), .value, .selectedIndex, .checked, .click( ) and .submit( ) are the commands that are needed for the vast majority of cases. By using these minimal set of browser commands and example code shown in element 261, training time for admin users is greatly reduced. However, the browser commands field 256 is not limited to this minimal set of commands and supports full Javascript. This allows admin users with basic Javascript programming skills to reproduce virtually any action a human may perform on a bank's site using code that can be run automatically.

A user can also recognize if a Rate Page is a pdf, or whether a subpage invoked by a master Rate Page is a pdf or a resource call made to a pdf document 71. If so, the Rate Page is noted in the bank record in field 253 as being a pdf and an appropriate mapping method determined 73 to extract the rate data.

As may be seen, steps 72, 76, 77, and pdf evaluation step 71, terminate at step 73. Step 73 determines which mapping method is best to extract rate data from the now classified Rate Page. The user does this by initiating process 80 (See FIG. 6) in which a series of semi-automated extraction processes are carried out in response to the classification steps 67-77, and resulting in a selection of a preferred rate mapping method 85.

Figure 6:
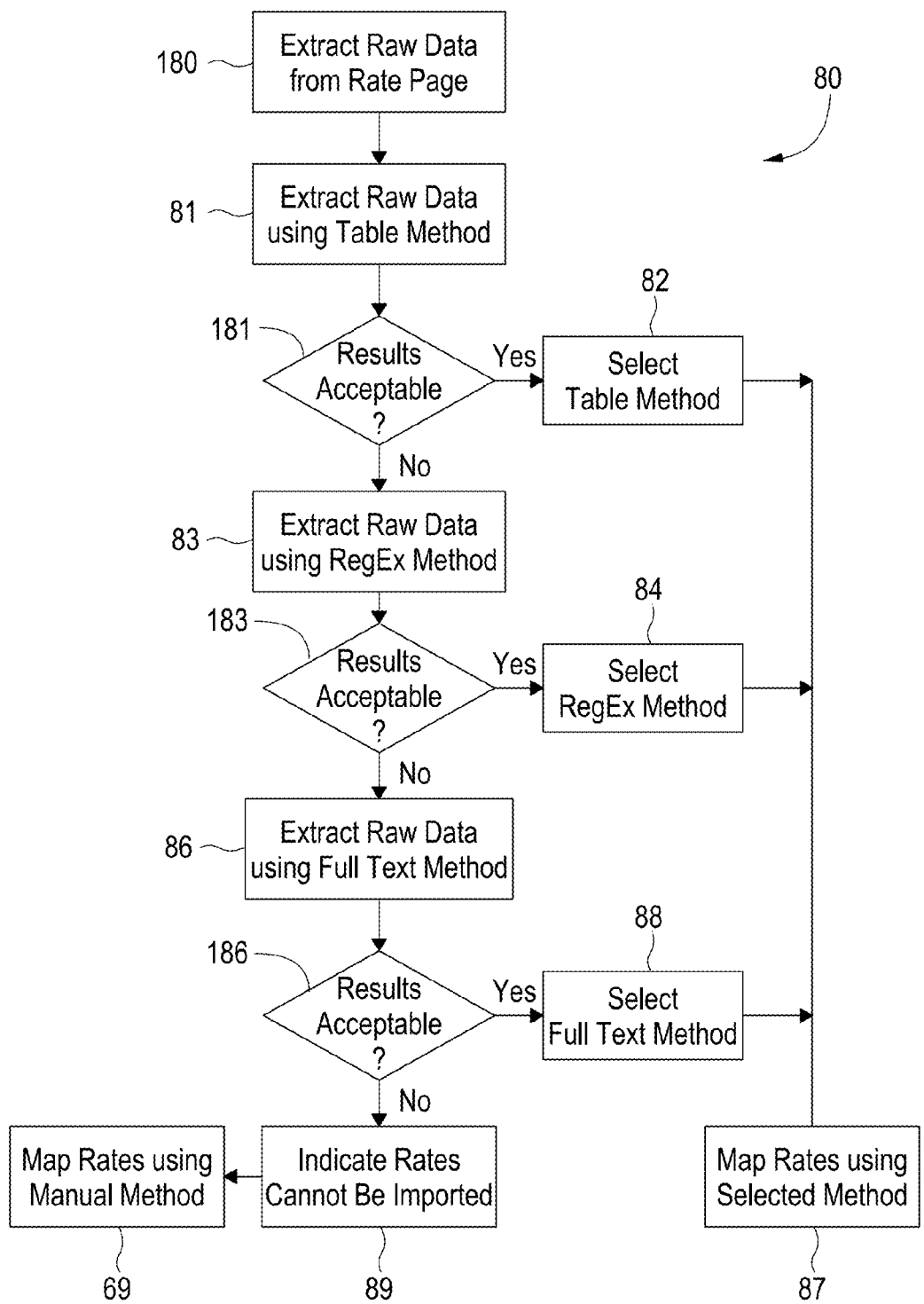
FIG. 6 is a process flow diagram of another portion of the rate mapping process to determine which automated processes shall be utilized to map rates.

As shown in FIG. 6, a series of processes 80 cause one or more screens to display rate data extracted from the bank's Rate Page based on a series of processes to determine which method is best for extracting rate data. All, some, or none, of the rate content may be displayed with each extraction process, but due to quality assurance concerns a preference order exists in which to map the rates as reflected in the vertical sequence of steps 81 through 89. This vertical preference sequence causes the user to select the best method for continually extracting rate data in the most consistent manner by looking at the results of each display in a preferred order, thereby selecting the process which yields the most favorable manner of extracting rate data. For the purposes of a PDF based Rate Page, the processes in step 80 are augmented with the C# SharpPDF library tool to retrieve and parse the PDF document to produce raw page data. Raw data 180 is obtained from a SharpPDF tool applied to a pdf based Rate Page, or through the browser sequence established in steps 72-77. Alternatively, the manual process is used 69 to obtain the raw data. The manual process 69 is simply a user visually seeing the rate values of a Rate Page and manually typing them into the system for each associated product. A manual process requires that a user recheck that Rate Page periodically to ensure correct current values.

The admin interface pages shown in FIG. 4B-4D assists in this process by presenting a series of "helper screens" resulting from each process. Starting with FIG. 4A, the Rate Page url has already been entered in field 252 and the classification of the Rate Page recorded in field 253, including any necessary browser commands 256. The helper screens are invoked by selecting a "map fields" element 259. Each helper screen shall be discussed in succession pursuant to the steps shown in FIG. 6, but in practice each or all of the screens may be displayed simultaneously, or in alternate succession as chosen by the user.

Preferably, raw rate data is subjected to a table extraction process 81 and evaluated 181 in the helper screen 270 shown in FIG. 4B. Most Rate Pages are in fact laid out in table format so process 81 is the most likely process to extract rate data from a bank's Rate Page. The process 81 finds the inner most <table> tags on the Rate Page and each row and cell is then parsed and the mappings are stored in the bank's record as a table number, row number, cell number and match number. This method is the least susceptible to errors from the Rate Page changing and is, therefore, the preferred process, yielding the best and most consistent results to the daily revisions to rate data. Help screen 270 displays frames 273 of each table found on the web page with their contents displayed in each table frame. The code uses a regular expression of [\.0-9]+ to identify all numbers as potentially mappable rates and hyperlinks them in each of the tables. The user may then select (i.e. by clicking) a bank product previously recorded in the database 47 while the bank's rate sheet was created, as shown in right column 292 on the screen 270, and matches it to a rate in the left frame 273 to create a mapping 87. The mappings are stored in the database 47 as the table number, row number, cell number and index of the numeric match within that table cell. Hence, the process records the exact location of each rate and associates it with a bank's product.

If the table method produces satisfactory rate data such that superior mapping results are easily attained 181, the table method process is recorded as the preferred method 82 and the rates are mapped 87 using this method and saved in database 47. Process 81 may be satisfactorily achieved using example software code found in Table 1.0 below.

TABLE 1

```
public static DataSet GetTablesFromPage (string html,bool stripHtml)
{
    string [ ] tables = GetTables (html);
    DataSet result = new DataSet ( );
    foreach (string table in tables)
    {
        DataTable dt = ConvertHtmlTableToDataTable (table, stripHtml);
        if (dt.Rows.Count > 0) result.Tables.Add (dt);
    }
    return result;
}
private static DataTable ConvertHtmlTableToDataTable (string html,
bool stripHtml)
{
    DataTable result = new DataTable ( );
    string [ ] rows = GetRows (html);
    foreach (string row in rows)
    {
        bool containsData = false;
        string [ ] cells = GetCells (row, stripHtml);
        for (int i = 0; i < cells.Length; i++)
        {
            if (result.Columns.Count <= i)
            result.Columns.Add (i. ToString( ));
        }
        DataRow dr = result.NewRow( );
        for (int i = 0; i < cells.Length; i++)
```

TABLE 1-continued

```
        {
            string cellContents = cells [i].ToString( ).Trim( );
            dr [i] = cellContents;
            if (cellContents != "") containsData = true;
        }
        if (containsData) result.Rows.Add (dr);
    }
    return result;
}
private static string [ ] GetRows (string html)
{
    html = html.Replace ("\n", "");
    html = html.Replace ("<tr", "i");
    html = html.Replace ("<TR", "i");
    html = html.Replace("<Tr", "i");
    html = html.Replace ("<tR", "i");
    string [ ] parts = html.Split ('i');
    string [ ] result = new string[parts.Length-1];
    for (int i = 1; i < parts.Length; i++)
    {
        result [i-1] = parts [i];
    }
    return result;
}
private static string [ ] GetCells(string html, bool stripHtml)
{
    string expression = @"<td [^>] *> (.*?) </td>";
    RegexOptions options = RegexOptions.IgnoreCase;
    Regex regex = new Regex (expression, options);
    System.Text.RegularExpressions.MatchCollection matches =
    regex.Matches (html);
    string [ ] result = new string [matches.Count];
    for (int i = 0; i < matches.Count; i++)
    {
        if (stripHtml) result [i] =
        Utils.RemoveHtml(matches [i].Value,false);
        else result [i] = matches [i].Value;
    }
    return result;
}
private static string [ ] GetTables(string html)
{
    string expression =
    @"<table\b [^>]*> (?: (?= ([^>]+))\1|<(?!table\b[^>]*>))
    *?</table>";
    RegexOptions options = RegexOptions.IgnoreCase;
    Regex regex = new Regex (expression, options);
    MatchCollection matches = regex.Matches (html);
    string [ ] result = new string [matches.Count];
    for (int i = 0; i < matches.Count; i++)
    {
        result [i] = matches [i].Value;
    }
    return result;
}
```

If the rates are not satisfactorily laid out in a table format, an attempt to identify the rates as a regular expression is attempted 83. Numerical values matching a typical APY format of ##.##% are retrieved on the bank's Rate Page and shown in a grid format for the user, with the mappings stored as a simple match number (see 283 of FIG. 4C). The regular expression of [0-9]*\.[0-9]* *% is used to find all numbers on the page that are formatted like an APY and present those as options for mapping as described above. The mappings are stored in the database 47 as the index of the regex match on the page. If the retrieved values provide coherent rate information 183, the user records in the system 84 that a Regular Expression or "RegEx" process is to be utilized to extract the rates and the rates are mapped using this method 87. The helper screen 280 shows the results of the step 83 from which rates may be selected and mapped as in steps 81-82. A suitable programming example for a RegEx process 83 may be seen in Table 2.0.

TABLE 2

```
public static double [ ] GetRegexMatches (string html)
{
    Regex regex = new Regex(@"[0-9]*\.[0-9]* *%");
    ArrayList al = new ArrayList( );
    foreach (System.Text.RegularExpressions.Match match in
regex.Matches (html))
    {
        string cleanedValue = match.Value.Replace(" ",
" ").Replace("%", " ");
        try
        {
            double value = Convert.ToDouble(cleanedValue);
            al.Add (value);
        }
        catch { }
    }
    double [ ] result = new double [al.Count];
    for (int i = 0; i < al.Count; i++)
    {
        result [i] = Convert.ToDouble(al [i]);
    }
    return result;
}
```

Assuming that the RegEx process fails to yield satisfactory results, a full text process 86 is be invoked as a last option. Sometimes rate data is not in a ##.##% format such as when a bank does not utilize percent signs on their rate tables. A regular expression of [\.0-9]+ is run to identify all numbers on the page and hyperlinks created for each numerical value so that a mapping may be created as in steps 81-82. FIG. 4D shows helper screen 290 with hyperlinked values 293 displayed in a window 291 positioned as a left frame from which mappings may be made with products displayed in right frame 292, and stored in database 47 as the index of the match on the page. This method finds all numbers on the page regardless of format and presents them as options for mapping. This method is useful in some cases, but it is also a last resort since it pulls in additional non-rate data values as mappable options, like phone numbers and dollar amounts in addition to APYs. Nevertheless, if the results as acceptable 186, the full text method is selected 88 and the rates are mapped 87 through the helper screen 290 using this method. A programming example for a satisfactory full text process 86 may be seen in Table 3.0.

TABLE 3

```
public static double [ ] GetFullTextMatches(string html)
{
    string text = Utils.RemoveHtml (html,false);
    System.Collections.ArrayList al = new
System.Collections.ArrayList( );
    string [ ] matches = RatePageParser.GetPotentialMatches (text);
    foreach (string match in matches)
    {
        try
        {
            double value = Convert.ToDouble (match);
            al.Add (value);
        } catch {string a = match; }
    }
    double [ ] result = new double [al.Count];
    for (int i = 0; i < al.Count; i++)
    {
        result [i] = Convert.ToDouble (al [i]);
    }
    return result;
}
```

In the event that all steps 180 through 186 in FIG. 6 yield unsatisfactory results, non-importation of banking rates is indicated in step 89 and the rates are simply entered manually by the user 69.

As indicated in prior FIG. 2, process 65 shown in FIG. 5 results in a static, but correctable process for continually importing bank rates from a bank website 10. That static but correctable process allows for continual updating of financial product rates using the importation process 90 shown in FIG. 7.

Figure 7:
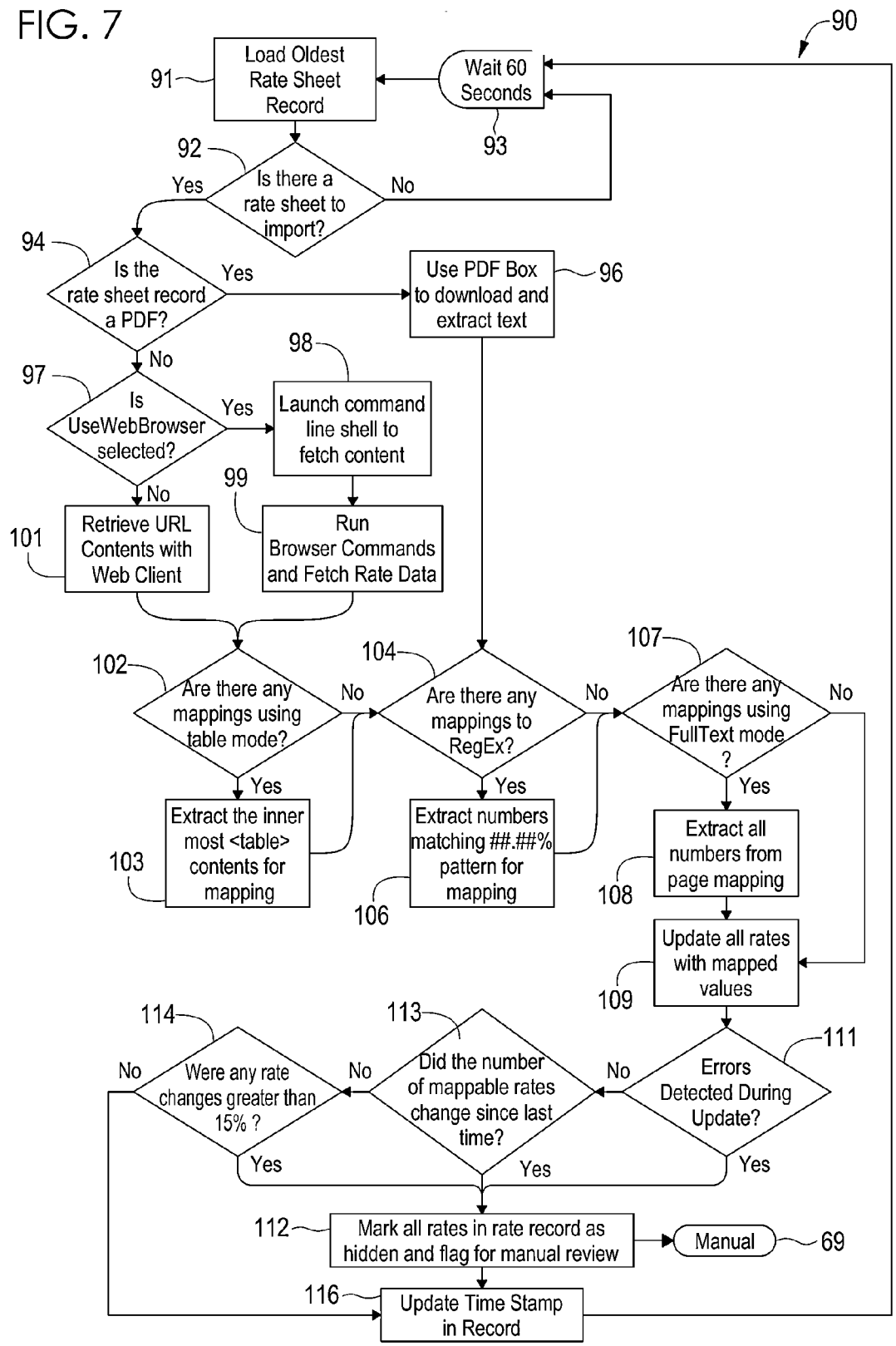
FIG. 7 is a process flow diagram of the automated rate importation process of the present invention; and, FIG. 8 is a website publishing the data obtained through the process shown in FIGS. 1-7.

Referring now to FIG. 7, importation process 90 may be run continually to allow updating of mapped bank product rates stored in the rate sheet of each financial institution held in the database 47. A running list of rate sheets is kept for each bank from which system 90 may be applied to import the current rates from the bank's website. The oldest or least current rate sheet is loaded 91 into process 90. If no rate sheet is available, the system waits a set period of time 93 and continually checks until a rate sheet is available. The process 90 checks to see if the rate information is held by a pdf 94 and if it is the rate information in the pdf is extracted 96 as discussed previously.

If the rate sheet record is not a pdf, the system checks to see whether a web browser is required to access the rate data 97. If it is, a command line shell process is launched to fetch the Rate Page content 98, including running any browser commends previously recorded in the mapping process 99. Alternatively, a web client simply retrieves the Rate Page data 101.

Once the raw information from the Rate Page is obtained, the system 90 imports the rate information as previously mapped and recorded in process 80 through steps 102-103, 104-106, or 107-108, and the rates are updated with the new rate values 109. A series of quality assurance checks are executed to ensure the accuracy of the new rate values. First if any errors are detected during the update 111, the rates are marked as hidden and flagged for manual review 112. If the number of mappable rates had changed from the last update 113 [where are the no. of mappable rates recorded during the importation process?], the rates are again recorded as hidden and the sheet flagged for manual review 112. Or, if any rate changes are more than 15% 114, the same occurs 112. The time stamp associated with the current rate sheet is then updated 116, and the next rate sheet in the queue is then processed as shown.

Figure 8:
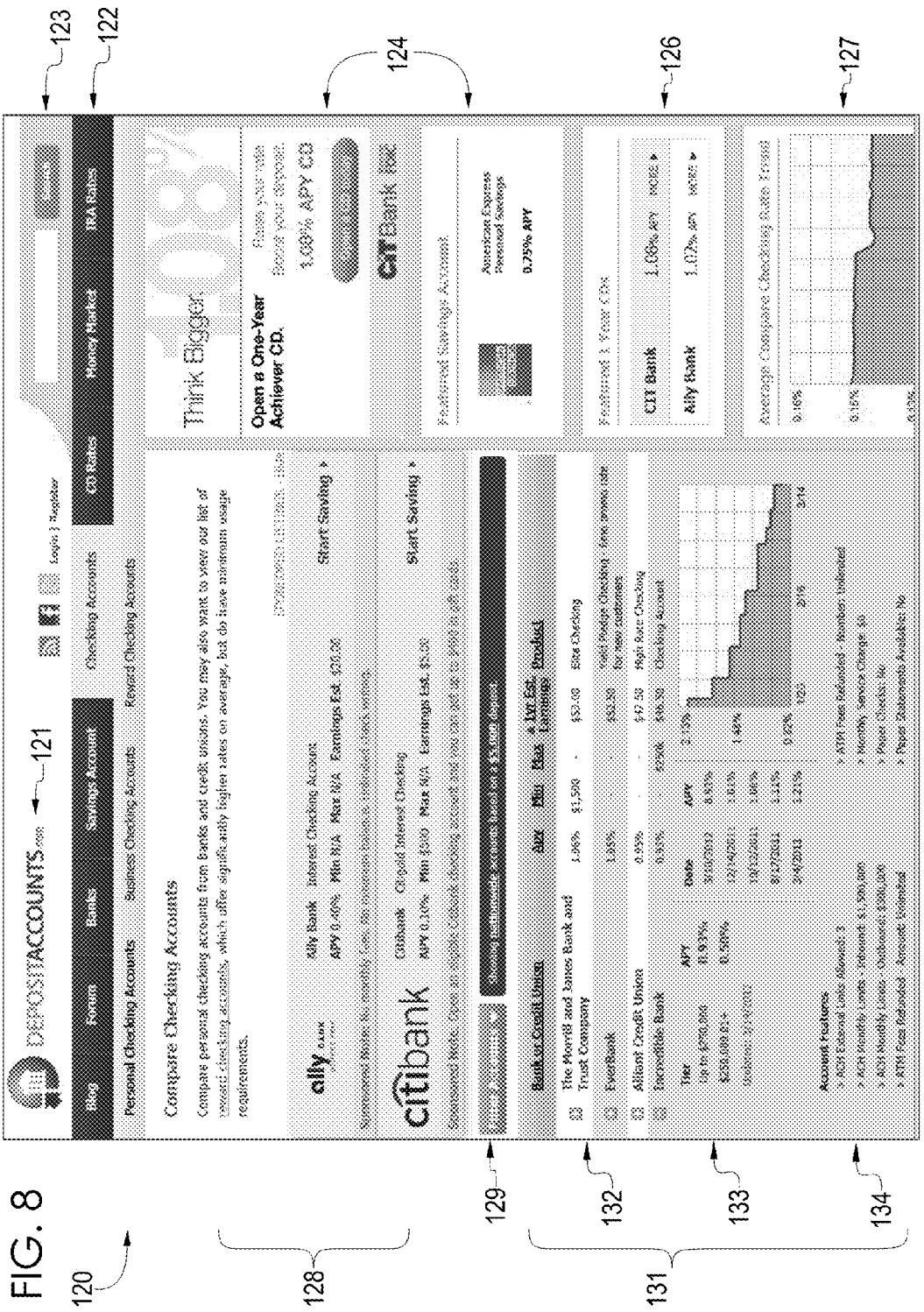

As may be evident, the database 47 will quickly accumulate a great quantity of financial information on a bank, from which a public website might access and display bank information. FIG. 8 shows a potential website 120 in which bank financial information, including current rate information may be displayed based on the information held in database 47. A search box may be provided 123 in which any bank name may be entered to retrieve information on a particular bank of interest, and a series of menu tabs 122 can be provided to facilitate navigation. Selective information about preferred financial institutions may be displayed in a window frame 128, with an advertiser of financial services prominent in the webpage 120 appearing at the right of the screen 124. A series of featured banks, including current rate data, may also be displayed 126, along with a graph 127 produced and updated frequently from rate date held in database 47.

The website would also likely allow filtering of different financial institutions based upon varying types of financial data recorded in the database, such as current and preferred rates on products meeting certain user specified criteria 131. For example, a selected group of banks may be listed in order or earnings 132, or rates tracked by investment tiers displayed, including potentially an associated graph 133, or a listing of selectable account features may be provided to allow rapid navigation by a user to prospective banks. It will also be clear that database 47 may be syndicated to multiple third parties to allow a wide dissemination of the accumulated financial data in a variety of useful formats. However, a critical component to the value of any such database is the timeliness and accuracy of the rate information associated with financial products offered by banks recorded in the system. Using the system disclosed herein provides a means for obtaining and keeping such rate information current, with a minimum of labor investment.

While I have shown my invention in one form, it will be obvious to those skilled in the art that it is not so limited but is susceptible of various changes and modifications without departing from the spirit thereof.

Having set forth the nature of the invention, what is claimed is:

1. A method for obtaining interest rates associated with a financial product from a plurality of websites, comprising the steps of:
   a. accessing an unaffiliated website having at least one webpage displaying at least one financial product having an interest rate associated therewith;
   b. recording profile attributes of said financial product as a record in a database;
   c. mapping said interest rate into said record by performing the steps of:
      i. identifying the url of the unaffiliated webpage displaying said interest rate;
      ii. determining the content type of said unaffiliated webpage displaying said interest rate by inspecting and classifying said webpage;
      iii. responsive to said content determination step determining the preferred mapping method for mapping said interest rate;
      iv. recording the preferred mapping method in said database; and
      v. recording the location of said interest rate into said database;
   d. importing the numerical value of said interest rate into said record; and,
   e. repeating steps a through d for said plurality of websites.

2. The method as recited in claim 1, wherein said step of importing the numerical value of said interest rate into said database comprises the steps of:
   a. retrieving said record holding profile information associated with said financial institution;
   b. responsive to information saved in said step of mapping said interest rate into said record, extracting numerical rate information from said webpage displaying said interest rate; and,
   c. updating the interest rates currently held in said database with the numerical rate information obtained in said step of extracting numerical rate information from said webpage displaying said interest rate.

3. The method as recited in claim 2, further including the step of utilizing an HTML based administration tool to assist in said profile recording and mapping steps.

4. The method as recited in claim 3, wherein said step of utilizing an HTML based administration tool comprises the steps of:
   a. utilizing a first helper screen to enter the profile attributes of said financial product in said database;
   b. utilizing a second helper screen to record the url associated with said webpage displaying said interest rate information, to classify said webpage displaying said interest rate information with a label selected from the group consisting of WEBBROWSER, PDF, FULL TEXT, and MANUAL; and recording a series of browser commands to assist in automatically displaying said webpage displaying said interest rate information during said importation step; and,
   c. utilizing a third helper screen to display interest rate information from said webpage displaying said interest rate information during said step of determining the preferred mapping method for mapping said interest rate and selecting hyperlinks presented to a user to display a potential mapping methodology.

5. The method as recited in claim 2, further including the step of publishing said interest rate information stored in said database on a website.

6. The method as recited in claim 5, further including the steps of:
   a. reviewing the numerical rate values retrieved and subjecting said values to a quality assurance test; and,
   b. if said quality assurance test is unsatisfied in step a, marking said rate value for manual review.

7. The method as recited in claim 6, wherein said method for obtaining interest rates associated with a financial product from a plurality of websites occurs within a 24 hour period.

8. The method as recited in claim 2, further including the steps of:
   a. reviewing the numerical rate values retrieved and subjecting said values to a quality assurance test; and,
   b. if said quality assurance test is unsatisfied in step a, marking said rate value for manual review.

9. The method as recited in claim 1, wherein said step of determining the content type of said webpage displaying said interest rate comprises the steps of:
   a. visually inspecting said webpage displaying said interest rate; and,
   b. classifying said webpage with a label selected from the group consisting of WEBBROWSER, PDF, FULL TEXT, and MANUAL.

10. The method as recited in claim 1, wherein said step of determining the preferred mapping method for mapping said interest rate comprises the steps of:
   a. extracting raw data from the webpage displaying the interest information responsive to the step of determining the content type of said webpage displaying said interest rate;
   b. displaying numerical rate information based upon a process selected from the group consisting of:
      i. finding the inner most <table> tags on the extracted raw data, parsing each cell in the table found, and recording each cell as a table number, row number, cell number, match number, and displaying the results in a table format;
      ii. retrieving numerical values having a ##.##% format in the extracted raw data and displaying those values in a grid format; and,
      iii. using the regular expression of [\.0-9]+ to retrieve all numerical values in the extracted raw data and displaying those values in a grid format;
   c. selecting a preferred method responsive to displays generated from steps i, ii, and iii and recording said preference in said database; and,
   d. if none of the methods displayed in steps i, ii, or iii are satisfactory, recording a preference of manual method for recording interest information in said database.

11. The method as recited in claim 1, further including the step of utilizing an HTML based administration tool to assist in said profile recording and mapping steps.

12. The method as recited in claim 11, wherein said step of utilizing an HTML based administration tool comprises the steps of:

a. utilizing a first helper screen to enter the profile attributes of said financial product in said database;

b. utilizing a second helper screen to record the url associated with said webpage displaying said interest rate information, to classify said webpage displaying said interest rate information with a label selected from the group consisting of WEBBROWSER, PDF, FULL TEXT, and MANUAL; and recording a series of browser commands to assist in automatically displaying said webpage displaying said interest rate information during said importation step; and, c. utilizing a third helper screen to display interest rate information from said webpage displaying said interest rate information during said step of determining the preferred mapping method for mapping said interest rate and selecting hyperlinks presented to a user to display a potential mapping methodology.

13. The method as recited in claim 1, wherein said step of importing the numerical value of said interest rate into said database comprises the steps of:

a. retrieving said record holding profile information associated with said financial institution;

b. responsive to information saved in said step of mapping said interest rate into said record, extracting numerical rate information from said webpage displaying said interest rate; and, c. updating the interest rates currently held in said database with the numerical rate information obtained in said step of extracting numerical rate information from said webpage displaying said interest rate.

14. A system for obtaining interest rates associated with a financial product from a plurality of websites, comprising:

a. means for accessing an unaffiliated website displaying at least one financial product having an interest rate associated therewith;

b. means for recording the attributes of said financial product in a database;

c. means for mapping said interest rate into said database, wherein said mapping means comprises:

i. means for identifying the url of the unaffiliated webpage displaying said interest rate;

ii. means for determining the content type of said unaffiliated webpage displaying said interest rate wherein said content determination means includes means for inspecting and classifying said webpage;

iii. means responsive to said content determination means for determining the preferred mapping method for mapping said interest rate;

iv. means for recording the preferred mapping method in said database; and v. means for recording the location of said interest rate into said database;

d. means for importing the numerical value of said interest rate into said database; and, e. control means for iteratively utilizing said accessing means, said recording means, said mapping means, and said importing means to obtain interest rates from said plurality of websites.

15. The system as recited in claim 14, wherein said means for accessing a website displaying at least one financial product having an interest rate associated therewith comprises an HTML browser program and wherein said database is remotely located relative to said means for accessing a website displaying at least one financial product having an interest rate associated therewith.

16. The system as recited in claim 15, wherein said means for recording the attributes of said financial product in a database comprises:

a. at least one profile administrative helper screen rendering a plurality of profile fields for entering profiling information relative to said financial product through an HTML browser window, each said profile field having an assigned record location in said database.

17. The system as recited in claim 16, wherein said means for mapping said interest rate into said database further comprises:

a. a first administrative helper screen rendering a plurality of content classification selection boxes, wherein each said selection box determines a method of extracting numerical financial rate information from said website displaying at least one financial product having an interest rate associated therewith;

b. a second administrative helper screen responsive to selections made in said first administrative helper screen, wherein said second administrative screen displays numerical rate information in a first HTML frame; and wherein said second administrative helper screen includes means for generating location assignments for numerical rate information displayed in said first HTML frame, said means for generating location assignments adapted for saving said location assignments in said database; and, c. a second HTML frame displayed in said second administrative helper screen for allowing a user to assign numerical values displayed in said first HTML frame in correlative association with profiling information relative to said financial product saved in said at least one administrative helper screen rendering a plurality of profile fields for said financial product.

18. The system as recited in claim 17, wherein said means for importing the numerical value of said interest rate into said database comprises:

a. means for loading a rate sheet held by said database associated with a particular financial institution;

b. means responsive to inputs made in said first administrative helper screen for extracting new numerical rate information from said website displaying at least one financial product having an interest rate associated therewith and updating rate information present in said rate sheet with said new rate information; and, c. means for processing a rate sheet to another institution.

19. The system as recited in claim 18, wherein said control means comprises means for monitoring when a rate sheet for a particular financial institution has been updated and importing new rates for that institution if said rates have not been updated within a specified timer period.

20. The system as recited in claim 14, wherein said means for mapping said interest rate into said database further comprises:

a. a first administrative helper screen rendering a plurality of content classification selection boxes, wherein each said selection box determines a method of extracting numerical financial rate information from said website displaying at least one financial product having an interest rate associated therewith;

b. a second administrative helper screen responsive to selections made in said first administrative helper screen, wherein said second administrative screen displays numerical rate information in a first HTML frame; and wherein said second administrative helper screen includes means for generating location assignments for numerical rate information displayed in said first HTML frame, said means for generating location assignments adapted for saving said location assignments in said database; and, c. a second HTML frame displayed in said second administrative helper screen for allowing a user to assign numerical values displayed in said first HTML frame in correlative association with profiling information relative to said financial product saved in said at least one administrative helper screen rendering a plurality of profile fields for said financial product.

21. The system as recited in claim 14, wherein said means for importing the numerical value of said interest rate into said database comprises:

a. means for loading a rate sheet held by said database associated with a particular financial institution;

b. means responsive to inputs made in said first administrative helper screen for extracting new numerical rate information from said website displaying at least one financial product having an interest rate associated therewith and updating rate information present in said rate sheet with said new rate information; and, c. means for processing a rate sheet to another institution.

\* \* \* \* \*